INVENTOR.
ANTHONY J. SARACENO
BY
Hyman Slavin

INVENTOR.
ANTHONY J. SARACENO
BY
Horace Sheets

INVENTOR.
ANTHONY J. SARACENO
BY

INVENTOR.
ANTHONY J. SARACENO
BY

INVENTOR.
ANTHONY J. SARACENO
BY

INVENTOR.
ANTHONY J. SARACENO
BY

United States Patent Office

Re. 26,312
Reissued Nov. 28, 1967

26,312

DETERMINATION OF VANADIUM CONTENT OF HYDROCARBON OILS BY ELECTRON PARAMAGNETIC RESONANCE SPECTROMETRY

Anthony J. Saraceno, Devon, Pa., assignor to Gulf Research & Development Company, Pittsburgh, Pa., a corporation of Delaware Original No. 3,087,888, dated Apr. 30, 1963, Ser. No. 36,381, June 15, 1960. Application for reissue Apr. 2, 1965, Ser. No. 457,238
21 Claims. (Cl. 208—251)

Figure 1:
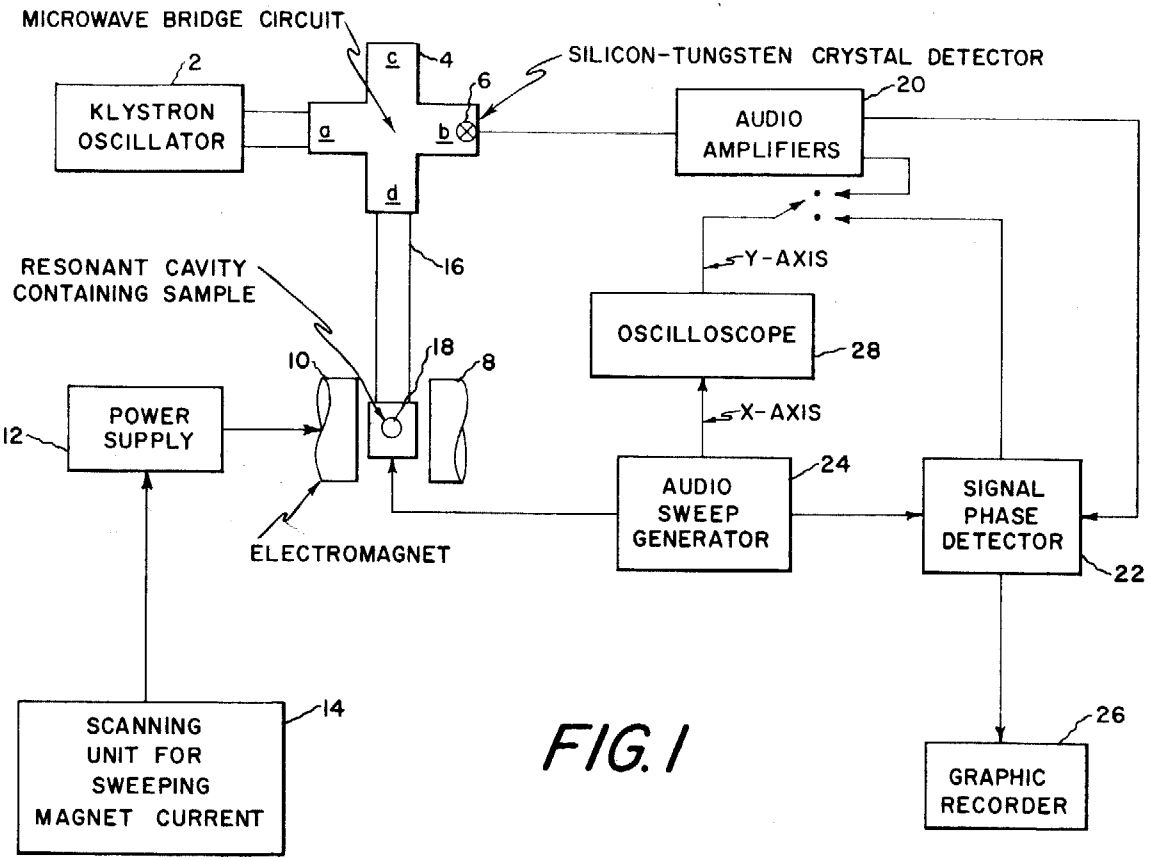

Matter enclosed in heavy brackets [ ] appears in the original patent but forms no part of this reissue specification; matter printed in italics indicates the additions made by reissue.

This invention relates to the quantitative determination of vanadium in petroleum oils using electron paramagnetic resonance techniques, and more particularly to the use of such determination as a basis for the control of petroleum refining process operations.

Vanadium, along with other trace metals, occurs as an impurity in many crude petroleum oils and in higher boiling distillates derived therefrom, normally in proportions in the range of a fraction of a part per million up to 100 parts per million or more. The vanadium undoubtedly occurs at least in substantial part in the form of oil-soluble complexes with porphyrin compounds, some of which are volatile and can be carried over into distillates.

The presence of vanadium in crude petroleum oils is objectionable in that it tends to deposit upon catalysts employed in the treatment of vanadium-containing fractions of such oils, whereby such catalysts are rendered less suitable for further treatment of petroleum oils. It has been found that even a relatively small amount, i.e., a few parts per million, of vanadium contamination in the oil feed to a catalytic conversion process can substantially alter catalyst selectivity. Loss of catalyst selectivity is important because when an objectionable amount of vanadium is deposit on a cracking catalyst, for example, a silica-alumina cracking catalyst, the catalyst will tend to promote formation of relaively smaller proportions of hydrocarbons boiling in the gasoline range and relatively greater proportions of gas and coke from a given charge stock for a given degree of conversion. Greater coke production, in turn, tends to restrict cracking capacity. Although the effect of vanadium is especially objectionable in connection with cracking catalysts, it should be noted that the detrimental effects of vanadium are not limited to cracking catalysts, as damage is also caused to catalysts in other types of processes. For example, vanadium will harm hydrogenation catalysts, as well as other petroleum oil processing catalysts. Also, what has been said of vanadium is generally applicable in greater or lesser degree to other heavy metals such as nickel, iron, and copper.

Because of the harmful effect of vanadium on oil-processing catalysts, it can be seen that it would be advantageous to give close attention to the vanadium content of certain oil streams in various refinery operations, so that distillation temperatures, feed stock ratios, or other factors might be promptly modified in response to changes in the vanadium content of a given oil stream on the one hand so as to avoid undue loss of selectivity by the catalyst contacted by such stream, and on the other, so as to avoid any unnecessary sacrifice in charge stock volume. However, close control of the vanadium content of process streams has not been considered practical heretofore because no suitably rapid and accurate method for determining the quantities of vanadium present in petroleum hydrocarbon oils has been available.

Instead, it has been customary to operate distillation units, catalytic cracking units, and the like in some other way. For example, it has been proposed to operate cracking units at vanadium concentration levels that are well within permissible or "safe" operating limits. This practice is not entirely satisfactory for the reasons that the vanadium content of the oil is maintained at a safe level only with the accompanying sacrifice of a portion of the yield of the upgraded products that would normally be obtainable if the particular process in question were operated at or close to the maximum permissible vanadium concentration level.

The present invention relates to control of a petroleum refining process in response to changes in the vanadium content of an oil stream as determined by electron paramagnetic resonance spectrometry. It has now been found that vanadium can be detected quantitatively in rapid manner in hydrocarbon oils, even in very low concentrations, by electron paramagnetic resonance spectrometric methods, whereby oil streams in refinery operations can be closely monitored for vanadium content and whereby relatively greater yields of upgraded product can be obtained from catalytic conversion of the stream without unduly rapid contamination of processing catalyst. Although the present invention is especially adapted for controlling refining processes, it involves not only a method of controlling a refinery process but also various subcombinations of such method including the particular method of vanadium analysis disclosed herein.

In accordance with the present invention the vanadium content of the oil is determined by sampling at intervals a hydrocarbon oil which, for example, can be a refinery distillate oil stream that in a typical case is one that is to be catalytically processed with a catalyst that is adversely affected by vanadium and/or other metals present in the oil together with vanadium, and that has a viscosity at the temperature at which it is to be subjected to electron paramagnetic resonance spectrometry sufficient that the minimum vanadium content to be detected will provide a detectable electrical signal. Preferably, the oil will have a viscosity of at least about five centistokes, and more preferably at least about 15 centistokes at the temperature at which it is subjected to electron paramagnetic resonance spectrometry. The thus-obtained oil samples are then subjected to electron paramagnetic spectrometry. When maximum practical sensitivity is important, this is preferably accomplished by subjecting the oil samples to radiation in a magnetic field, the wave frequency of the radiation and the strength of the magnetic field together being such that electron paramagnetic resonance of the paramagnetic vanadium electrons in the oil occurs, that is, such that energy is absorbed by resonance of the paramagnetic electrons in the vanadium present in the oil sample. Normally, at least one of the wave frequency and said magnetic field strength to which the oil is subjected during such spectrometry will be varied through at least the portion of the electron paramagnetic spectrum of the vanadium that includes the maximum variation in resonance output attributable wholly or in part to paramagnetic vanadium in the oil. However, this is not absolutely necessary, and the wave frequency and magnetic field strength can be maintained constant so long as together they are such that electron paramagnetic resonance occurs. The quantity of magnetic energy absorbed by electron paramagnetic resonance of the vanadium is manifested by an electrical output, produced as described hereinafter, whose intensity is related to the quantity of absorbed energy and consequently, to the amount of paramagnetic vanadium in the oil sample. This output is electrically detected and an electrical signal is formed whose intensity is also related to said quantity of absorbed energy and consequently, to the amount of paramagnetic vanadium in the oil sample. For purposes of controlling refinery operations, it is not absolutely necessary to determine the absolute quantity of vanadium present in the oil, it being sufficient merely to calibrate such control in terms of the intensity of the aforesaid signal or some suitable function thereof that is also related to the quantity of energy absorbed by paramagnetic vanadium, such as the maximum vanadium peak height in the curve of the first derivative of the plot of vanadium signal intensity against whichever of the wave length or magnetic field strength is varied. When the absolute quantity of vanadium present in the oil sample is considered important, such quantity can be determined by measuring the ratio for each sample of the intensity of the aforesaid signal, or a function of such intensity that is also related to the quantity of energy absorbed, such as derivative peak height, to the intensity of the signal or function thereof obtained in a like manner for a sample of a reference oil that contains a known quantity of paramagnetic vanadium, and that also has a viscosity at the temperature at which it is subjected to electron paramagnetic spectrometry sufficient that the vanadium contained therein will provide a detectable electric signal. The conditions under which said ratios are determined are such that the ratios are obtained for, or as if, any differences in viscosities between the oil samples and the reference oil are constant, and preferably small, desirably within about 20 centistokes of zero. The vanadium content of the oil sample being tested will bear the same relation to that of the reference oil as the thus-measured ratio. For example, when the reference oil has a vanadium content of two parts by weight per million and the ratio of vanadium derivative peak heights for the oil being tested and the reference oil is 2:1, the oil being tested will have a vanadium content of about four parts per million.

In any event, for purposes of refinery process control, one or more variable conditions of a selected operation, for example, the conditions under which the oil stream is prepared, or the conditions of the catalytic treatment to which the oil stream is to be conducted, are adjusted in response to changes in the intensity of the aforesaid signal or a function thereof that is related to the quantity of energy absorbed by the vanadium, for example, the derivative peak height, or to changes in the above-described ratio, so as to compensate for changes in the vanadium content of the oil, or in a particular case, so as to maintain a predetermined level of catalyst selectivity. The refinery process can be varied to compensate for changes in the vanadium content of the oil feed, for example, by adjusting the distillation conditions under which the oil stream being tested, or a portion thereof, is formed, for example, so as to increase or reduce the end point of such stream or portion, whereby a greater or lesser proportion of vanadium will be permitted in the stream. In a catalytic conversion process, such as catalytic cracking, the desired catalyst selectivity and/or activity can be maintained by adjusting the rate at which used catalyst is replaced with fresh catalyst in the process, or by a combination of this step with the above-mentioned control of distillation conditions, or other steps. In the preferred embodiments, the refinery stream whose vanadium content is measured and controlled will be either a side stream, preferably the highest boiling side stream, of a vacuum distillation tower used to prepare feed for a catalytic cracking unit, or alternatively, such refinery stream can be the entire feed to a catalytic cracking unit.

Of fundamental importance in the present invention is the discovery that the vanadium present in hydrocarbon oils derived from petroleum is wholly in a form that exhibits a characteristic electron paramagnetic resonance spectrum. Electron paramagnetic resonance or EPR can be defined as the resonant transition of unpaired—that is, paramagnetic—electrons in atomic or ionic electronic shells between lower and higher energy levels that occurs upon absorption of energy from the magnetic component of radiation energy by paramagnetic electrons within an externally applied magnetic field.

That electrons can be affected by a magnetic field, that is, can exhibit magnetic properties, is possible because electrons not only possess electric charges but also magnetic moments associated with their angular momentum or spin. Inasmuch as atoms consist of a cloud of electrons about a nucleus, atoms as well as ions derived therefrom may also exhibit magnetic properties. These properties are attributable in part to the spin moments of the individual electrons but also in part to the magnetic moments resulting from the orbital movements of such electrons. Thus, the absolute magnetic moment in any given atom will be the resultant of all the electron spin and orbital moments in such atom. Actually, very few kinds of atoms exhibit magnetic properties, because the resultant of the spin and orbital moments for most of the electrons in most atoms and ions is zero because these electrons move in closed shells, and the resultant of the spin and orbital moments of such shells is zero. For example, the resultant magnetic moment of the atoms of inert gases is zero, since their electron clouds consist entirely of closed shells. However, a few atoms and ions exist whose electron clouds contain incompletely filled shells. These atoms and ions have a resultant magnetic moment that can be oriented in a magnetic field. Usually, it is only the spin component that can be oriented, as the orbital component is normally locked or "quenched" by the electric field in the atom or ion. Atoms or ions that have a resultant magnetic moment capable of being oriented in a magnetic field are said to be paramagnetic.

Not only can unpaired or paramagnetic electrons of atoms or ions having an unfilled shell be oriented in a magnetic field, but also the energy levels of these electrons can be altered by the energy of an external field. Electron paramagnetic resonance takes place as a result of these changes in energy levels, that is, the absorption of energy by the paramagnetic electrons, and can be observed when the effect of the electrical field surrounding the paramagnetic atom or ion is such as to permit transitions of paramagnetic electrons from a lower to a higher energy level without objectionably short spin-lattice and spin-spin relaxation times. The effect of the electric field is important because when a very strong electric field is present, the applied magnetic field may be sufficient to change the energy levels of the paramagnetic electrons but at the same time insufficient to bring such levels close enough together for transitions to occur. Resonance cannot be observed unless transitions of paramagnetic electrons from lower to higher energy levels occur. On the other hand, the individual energy levels may be so broadened as a result of the spin-lattice and spin-spin interactions and/or dipole broadening in a particular crystal environment that the spin-lattice and spin-spin relaxation times are objectionably short, as a result of which the absorption line in the resonant spectrum may be so broad as to become essentially indistinguishable. Even when the effect of the field is not so great as to prevent any observation of resonance of paramagnetic electrons, it can still be sufficiently great to modify or distort the resonance that is observed. For example, it has been found that the same paramagnetic vanadium compound will produce entirely different EPR spectra in different hydrocarbon solvents. Accordingly, because of the effect of the environment or field upon electron paramagnetic resonance, whether resonance can be detected at all and the nature of the resonance that can be detected in any given instance is largely empirical.

It has been found that the electrical field, including the crystal environment for the vanadium in heavy petroleum oils, that is, the arrangement of atoms immediately coordinated to the metal, is of the noncubic type with axial symmetry, which is favorable to electron paramagnetic resonance, and that such vanadium is wholly in the paramagnetic, quadrivalent state. The common valence states of vanadium are +2, +3, +4, and +5. The +5 state is diamagnetic and cannot be observed by EPR spectroscopy. The +3 state, although paramagnetic with two unpaired electrons per vanadium ion, cannot be detected at all in the presence of many electric fields and in any event can be detected only at low temperatures. The remaining valence states of +2 and +4 are detectable by EPR spectroscopy. The +4 state requires a noncubic field and this requirement is satisfied by the vanadyl complexes in petroleum oil. The +2 state is relatively unstable, and in any event produces an entirely different paramagnetic resonance spectrum from vanadyl vanadium.

Thus, it is possible to observe paramagnetic resonance for the vanadium found in heavy petroleum oils by virtue of a fortuitous combination of circumstances, including among other things, the fact that all of the vanadium occurring in all heavy petroleum hydrocarbon oils is in the same paramagnetic, quadrivalent form, the presence of a crystal environment for such vanadium—which is the same for all petroleum oils—permitting transition of paramagnetic electrons from lower to higher energy levels and favoring a relatively narrow resonance band width, and the fact that no other material is present in petroleum oil that has a paramagnetic resonance spectrum such as to interfere with the critical portion of the vanadium spectrum. The correlation of resonance intensity and vanadium content is made possible by the additional fact that there is substantially uniform solvent effect upon the paramagnetic spectrum of vanadium, when the solvents are of comparable viscosity.

In accordance with the analytical method of the present invention a sample of an oil whose vanadium content is unknown and that has a viscosity at the temperature at which it is to be subjected to electron paramagnetic spectrometry sufficient that the minimum vanadium content to be determined will provide a detectable electrical signal, e.g., at least about 5 centistokes and preferably at least about 15 centistokes at the temperature at which the vanadium content is to be measured, is subjected to electron paramagnetic spectrometry so as to provide an electrical output whose intensity is related to the amount of energy absorbed by the sample. The vanadium content of the oils disclosed herein appears to be proportional to the maximum intensity of this output, that is, the maximum height of the normal absorption curve that is attributable solely to vanadium, or a suitable function thereof, such as the maximum positive slope of the part of the absorption curve attributable solely to vanadium, that is, the height between points of maximum deflection of the strongest peak attributable solely to vanadium on the curve of the first derivative of the normal absorption curve, or such as the area under the normal absorption curve after correcting for any area attributable to materials other than vanadium, or such as the area under a portion of the normal absorption curve attributable solely to vanadium, or such as the height, or difference, between points of maximum deflection on a portion of the normal absorption curve that is attributable solely to vanadium. The vanadium concentration in the oil can be ascertained by measuring the ratio, or relative intensity of such electrical output or function thereof for the unknown oil sample and the corresponding electrical output or function thereof for a reference oil containing a known amount of vanadium and preferably having comparative viscosity characteristics. The vanadium concentration in the unknown sample will bear the same ratio to the vanadium concentration in the known sample or standard as the ratio of electron paramagnetic resonance output intensities or corresponding functions thereof. Excellent results have been obtained by measurement of the ratio of maximum vanadium peak heights in the derivatives of the normal absorption curves, and this is a preferred method. Of course, it will be understood that in determining relative vanadium concentrations by determining relative derivative peak heights, it is only necessary to compare one peak of the unknown spectrum with the corresponding peak of the standard. There are several derivative peaks in the vanadium spectrum for a heavy petrileum oil, see FIGURE 3(a), but in the interest of simplicity and accuracy, it is usually preferred to determine the relative ratio of the maximum vanadium derivative peak heights, see FIGURE 2.

When the petroleum oil contains materials whose electron paramagnetic resonance spectra overlap and interfere with the vanadium spectrum, for example, free radicals, as in the case with oils that have been subjected to heat treatment, it is particularly preferred to utilize the derivative curve in determining the ratio of absorption intensities, as by such means the energy absorption due to free radicals can be excluded easily. This is accomplished by comparing the maximum peak heights, that is, the linear distances between the maximum and minimum points of deflection on the derivative curve, e.g., $dI/dH_0$, for the strongest resonance line that is wholly attributable to vanadium. Measurements involving the trough depth of the derivative curve on the high field side are avoided in the interest of greatest accuracy, because the beginning of the free radical resonance absorption derivative peak overlaps the trough depth of the strongest vanadium absorption derivative line, as will be seen by comparison of FIGURES 3(*a*) and 3(*b*). The spectrum in FIGURE 3(*b*) contains a free radical peak or line, whereas that of FIGURE 3(*a*) does not. Although measurement of the EPR signal intensity and functions thereof is preferably carried out in connection with portions of the intensity curve that are attributable solely to vanadium in the interest of greates accuracy, this is not absolutely necessary and the process can be carried out with good results without regard to the presence of other resonant substances, especially where the proportion of such substances is relatively small.

Quantitative determination of vanadium concentrations in petroleum oils is facilitated by the use of one or more reference oil solutions containing known proportions of paramagnetic vanadium. When a plurality of reference solutions is used, the absorption intensity or a suitable function thereof can be plotted against vanadium concentration for each of the reference solutions, and the measurement of the relative absorption ratios between the unknown sample and the known reference can be obtained graphically. When a single reference solution is used the ratio is obtained mathematically in the usual way. Of course it also will be understood that for a given unknown oil, one easily can provide an instrument to record the maximum absorption intensity, or a suitable function thereof, wherein the indicating face of the instrument is calibrated in terms of vanadium concentration.

Any hydrocarbon oil derived from petroleum and having a viscosity of at least about 5 centistokes at the temperature at which it is subjected to electron paramagnetic spectrometry can be analyzed for vanadium in accordance with the herein-disclosed analytical method, provided that a comparable oil containing a known amount of vanadium and preferably having substantially similar viscosity characteristics under the conditions of analysis, is employed as the reference solution. As a practical matter, for purposes of refinery process control, one can obtain a high degree of accuracy merely by employing a previously obtained sample of the oil that is to be processed and analyzed by EPR spectrometry as the known standard, the amount of vanadium therein being first determined by chemical analysis. As long as the petroleum oil or oils from which the test sample is derived, the preceding process steps, and the analytical conditions remain essentially the same, the viscosity characteristics of the process stream being sampled and tested for vanadium content will normally be sufficiently constant to achieve accuracy within about +0.1 p.p.m. vanadium at an over-all concentration of 1 part per million vanadium, which is ordinarily sufficient for the purpose of the present invention.

The viscosity of the unknown oil samples and the reference oil are important factors insofar as the sensitivity of the herein-disclosed method is concerned. Thus, it has been found that maximum resonance intensity of the normal absorption curve that is attributable solely to vanadium, and consequently various functions thereof, decrease with decreasing viscosity of the oil. When the viscosity of the oil is less than about 5 centistokes and the vanadium content of the oil is small, e.g., 1 part by weight per million, the maximum intensity of the vanadium resonance is so small that the accuracy of the method is affected substantially. Accordingly, it is preferred to carry out the analysis under conditions such that the oil subjected to EPR spectrometry has a viscosity of at least about 5 centistokes, when the vanadium content of the oil is small. Substantially greater analytical accuracy will be obtained for such oils at conditions such that the viscosity of the oil will be at least about 15 centistokes and preferably even more. However, the rate at which the vanadium resonance intensity increases will have normally declined substantially above about 50 centistokes, and little increase in intensity is obtained with viscosity increases above about 150 centistokes, even up to and including the solidified state. Although it is preferred to utilize the herein-disclosed method in conjunction with heavier oils for the reasons indicated above, it will be understood that lighter or lower viscosity oils can be employed with good results where the vanadium content is relatively great.

Inasmuch as the viscosity of the oil affects the maximum vanadium resonance intensity, it is important in the interest of accuracy that the viscosities of the unknown oil and the reference oil, whether the latter is an earlier-obtained sample of the unknown oil or some other oil, be taken into consideration. Preferably, the viscosities of the reference oil and the unknown oil will be about the same at the conditions under which the comparison is made. However, some variation is permissible. Thus, it has been found that a viscosity difference of up to about 20 centistokes between the oils will still permit an analytical accuracy within about 0.1 to 0.2 part per million vanadium in a total concentration of about 1 part per million, which is usually satisfactory. Greater differences in viscosity tend to promote lower sensitivity. It may be noted that an experienced operator can normally judge equality of viscosity within about 20 centistokes by mere observation.

Although in the interest of greatest sensitivity it is preferred that the oil samples being compared have about the same viscosities at the conditions of the analysis, this is not absolutely necessary. Thus, when controlling a refinery process, the controlling factor is the change in the ratio of resonance intensities or functions thereof, and the ability to detect such change accurately is not dependent upon oils having the same viscosity, but rather in maintaining any difference between the viscosities of the oil samples and the reference oil essentially constant, preferably within about 20 centistokes of constant. For example, good results can be obtained with unknown oil samples whose absolute viscosity is about 128 centistokes at the temperature at which they are subjected to EPR spectrometry and a reference oil of considerably different viscosity, e.g., 38 centistokes at the temperature in question—provided the viscosity of the reference oil is sufficient that the vanadium contained therein will provide a detectable signal—because the difference in viscosities between the oil samples and the reference oil is constant.

Although the above-described ratios are preferably determined when the viscosities of the unknown oil and the reference oil are substantially similar, or when the difference therebetween remains relatively constant, even these precautions are not absolutely necessary to the success of the invention. The ratio of vanadium paramagnetic resonance intensities for the unknown oil and the reference oil can be determined in a manner such as to correlate with the vanadium proportions even when the viscosities of the oils are substantially different by determining the ratio for each sample of unknown oil and the reference oil as if they had substantially similar viscosities, that is, by application of a suitable correction factor. Thus, in a specific case, when the vanadium resonance signal intensity for the reference oil is measured at room temperature for a heavy gas oil that is solid at such temperature, and the corresponding signal intensity or function thereof for the unknown oil is measureed at 120° F. and at a viscosity of 68 centistokes, it is seen from a plot of the normalized signal intensity against viscosity that the signal intensity is only about 0.62 as great at a viscosity of 68 centistokes as that obtained in solid condition, or essentially at infinite viscosity. Thus, to obtain the ratio for the oils at comparable viscosities, the signal intensity of the unknown oil can be multiplied by a factor of about 1.6.

When it is desired to determine the vanadium content of a light oil having a small vanadium content and having a viscosity less than 5 centistokes at the conditions of analysis, the nature of the unknown oil can be varied, without affecting the vanadium content, so as to provide an oil comparable to the oil standard. Thus, in the case of a whole crude oil using a gas oil calibration curve, good results have been obtained by deriving a heavy fraction from the crude oil that has a viscosity comparable to that of the standard, for example, by distillation of the crude oil to eliminate the low viscosity, low-boiling, nonvanadium-containing ends. Good accuracy has been obtained by this expedient in the analysis of a variety of crude oils, including Santa Barbara, South Louisiana, Canadian, West Texas, Eastern and Western Venezuelan crude oils, by the herein-disclosed method, using a heavy Taparito gas oil calibration curve.

The herein-described method of analysis can be carried out under a wide variety of conditions. Excellent results are obtainable at ambient atmospheric temperature, as the vanadium resonance signal intensity will be relatively large under these conditions. On the other hand, good results can be obtained at elevated temperatures so long as the temperature employed is insufficient to reduce the viscosity of the oil below about 5 centistokes. For example, in the case of a specific heavy gas oil, the vanadium resonance signal intensity was found to be about 0.9 as great at 100° F. as at atmospheric temperature, about 0.76 as great at 110° F. as at atmospheric temperature, about 0.62 as great at 120° F. as at atmospheric temperature, the difference in intensity being primarily on account of the effect of the temperature upon the viscosity of the oil. Because of the relatively small effect of temperature on signal intensity, good results can be obtained even when the temperature of the unknown oil and the standard differ as much as 10 to 15° F. or more, especially when the EPR signal intensity is corrected for temperature difference. Although the sensitivity of the method is reduced somewhat by the use of elevated temperatures, such temperatures may be desirable in connection with any process involving sampling, especially continuous sampling, as the oil will be in the liquid state at such temperatures, whereby flow through the analytical apparatus is facilitated. Although continuous flow of the oil is most easily obtained when the oil is in a liquid state, it will be understood that liquefaction is not essential to continuous sampling. Many oils, such as heavy gas oils, etc., although essentially solid at atmospheric temperature can be caused to flow through the desired sampling conduits and sample tubes in such state by application of pressure as with a gear pump. Because of the relatively improved analytical sensitivity and accuracy obtainable when the test oils are in viscous state, we prefer to carry out the method of this invention while maintaining the oils at temperatures in the range of ambient atmospheric temperature to about 110° F., preferably 100° F., notwithstanding that the oils may be in a solid or semisolid condition at such temperatures, as a result of which continuous sampling may be more difficult.

The method of analysis disclosed above can be carried out rapidly, in a matter of minutes or even seconds, unlike the fastest presently available chemical methods of comparable sensitivity to the present method. The disclosed method is readily adaptable to continuous analysis of a flowing oil stream and as a consequence is highly suitable for purposes of refinery process control. For purposes of refinery process control, the information gained as to the vanadium concentration of an oil sample can be used to modify some condition in a refinery process which either affects or is affected by the vanadium concentration. For example, when the oil sample being tested is a heavy gas oil side stream from a vacuum distillation tower used to fractionate a crude oil residue that previously has been topped by distillation at atmospheric pressure, a reduction in the vanadium content of the stream can be effected by reducing the proportion of the highest boiling components in the oil, or by reducing the end point of the side stream in any suitable way, for example, by automatic or manual reduction of the rate at which fuel is supplied to the heater in which the oil feed to the distillation tower is heated to distillation temperature, by reduction of the rate at which steam is supplied to the flash zone and/or stripping zone of the tower, by changing of the rate at which oil feed is supplied to the flash zone, or in other ways. An increase in the vanadium content of the oil can be obtained by increasing one or more of the above-indicated rates. When the information obtained as to the vanadium content of a gas oil stream from a distillation tower is used to control the vanadium content in the side stream, the distillation unit can be operated very close to the maximum safe vanadium content, whereby catalytic charge stock having the maximum safe end point will be provided to the catalytic unit at all times.

Although it is considered preferable to control the vanadium content of the feed stream to a catalytic treating unit more or less at its source, this is not absolutely necessary. The information gained as to the vanadium content of an oil that is to be catalytically treated can be used instead to regulate operation of the catalytic treating step itself, so as to obtain the desired product yield, notwithstanding excess vanadium in the feed. For example, when the oil sample being tested is a gas oil feed to a catalytic cracking unit, the information obtained as to the vanadium content of the oil can be used to increase the rate at which makeup catalyst is added to the unit when the vanadium content of the oil is found to be objectionably great and to reduce this rate when the vanadium content is found to be relatively small. When the information as to vanadium content is used to control the make-up catalyst addition rate, the distillation unit can be operated at what would normally be considered an unsafe vanadium limit, but with maximum yield of catalytic charge stock.

It will be understood that for purposes of refinery process control, it is not necessary that the vanadium concentration actually be determined in conventional units of measurement. It is sufficient merely to control the desired variable directly, either manually or by means of suitable transducing means adapted to convert the electrical output of the EPR spectrometer to a mechanical, pneumatic, hydraulic or electrical output suitable to operate valves or the like, in accordance with the vanadium electron paramagnetic resonance intensity as such or in accordance with a suitable function of such intensity.

Any suitable electron paramagnetic resonance spectrometer—that is, EPR spectrometer—having the sensitivity required to provide a relatively undistorted output when used in conjunction with the low vanadium concentrations that occur in petroleum oils can be used to subject the oil sample to EPR spectrometry in accordance with this invention. There are at present three main types of spectrometers, namely: the balanced bridge type, the oscillating detector type, and the induction type. In theory, any of these types of spectrometer can be used for purposes of the present invention, as each is capable of detecting the absorption mode of the resonance signal, as required, and as each is capable of about the same sensitivity under ideal conditions. However, for practical purposes, the balanced bridge type of spectrometer that is adapted to operate in the microwave frequency region, especially the "X band" (8.20–12.40 kmc./s.) and the "K band" (18.00–26.50 kmc./s.), is preferred. Instruments of this type can be designed so that the EPR signal for vanadium in petroleum oils can be observed either by varying the microwave frequency while maintaining the sample in a magnetic field of constant strength or by varying the strength of the magnetic field while maintaining the microwave frequency constant. Excellent results are obtainable with the latter type system. A system of this type is illustrated in FIGURE 1 of the drawings.

Figure 2:
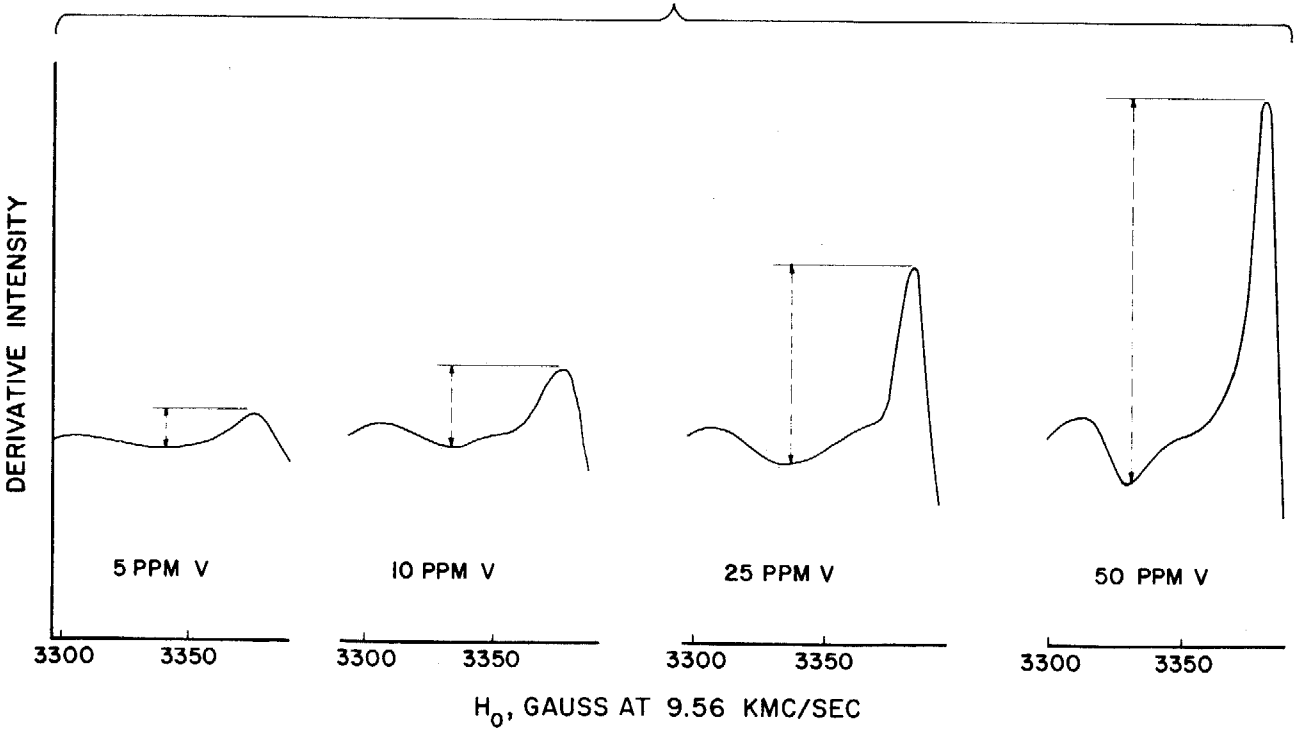
Figure 3:
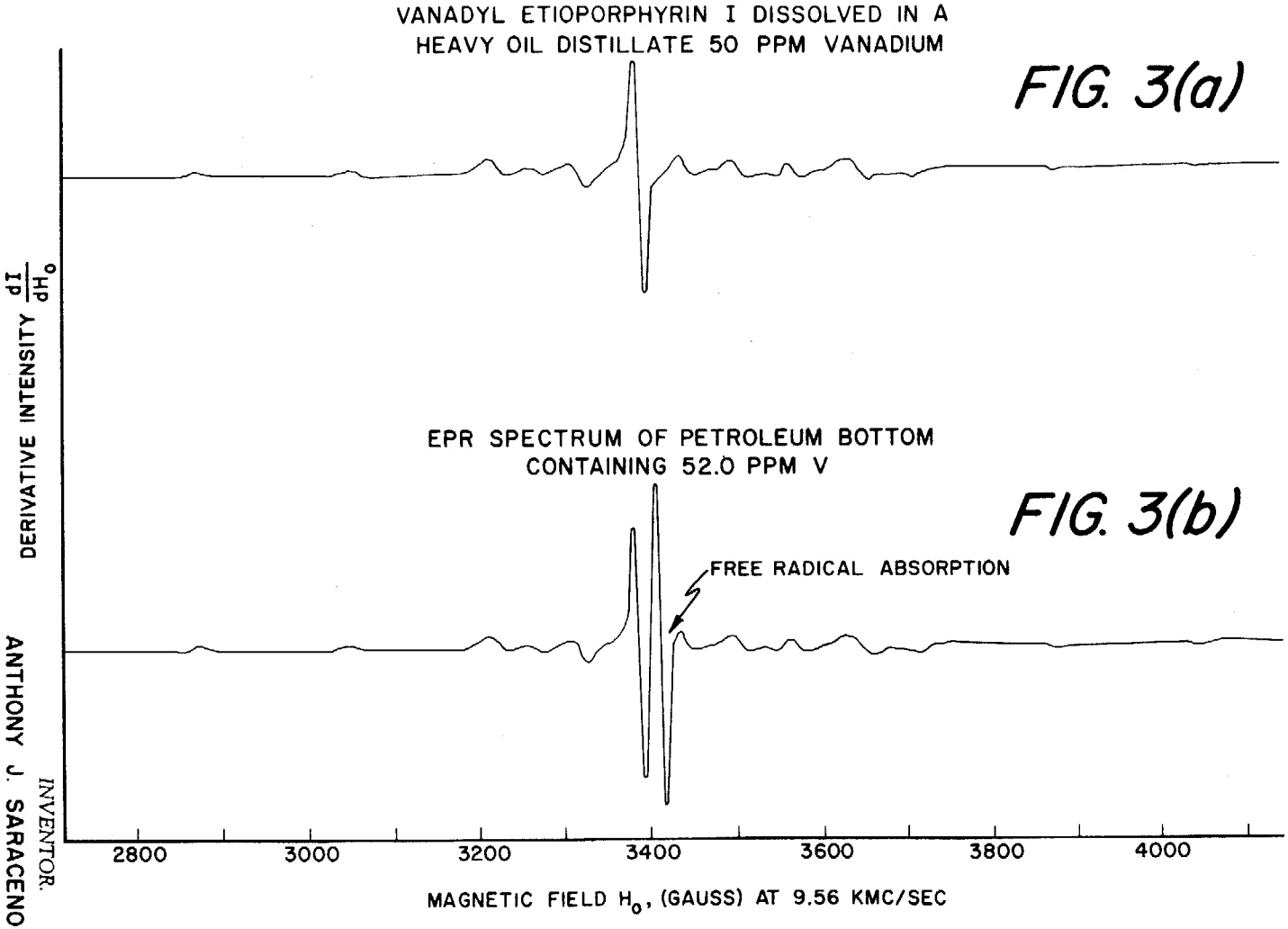
Figure 4:
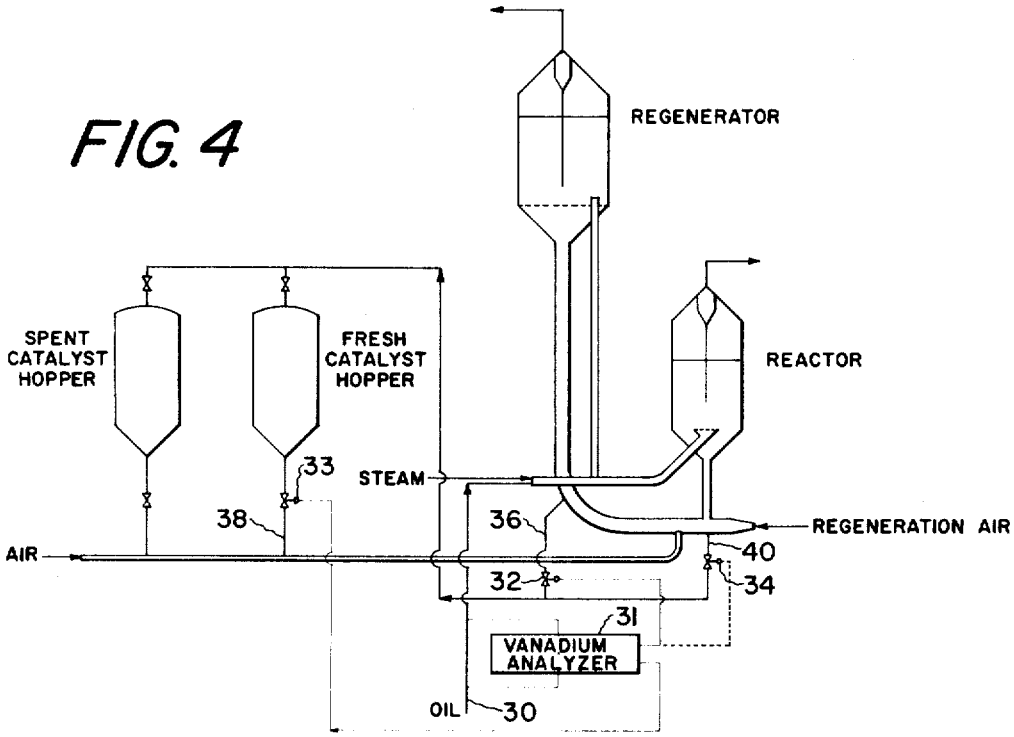
Figure 5:
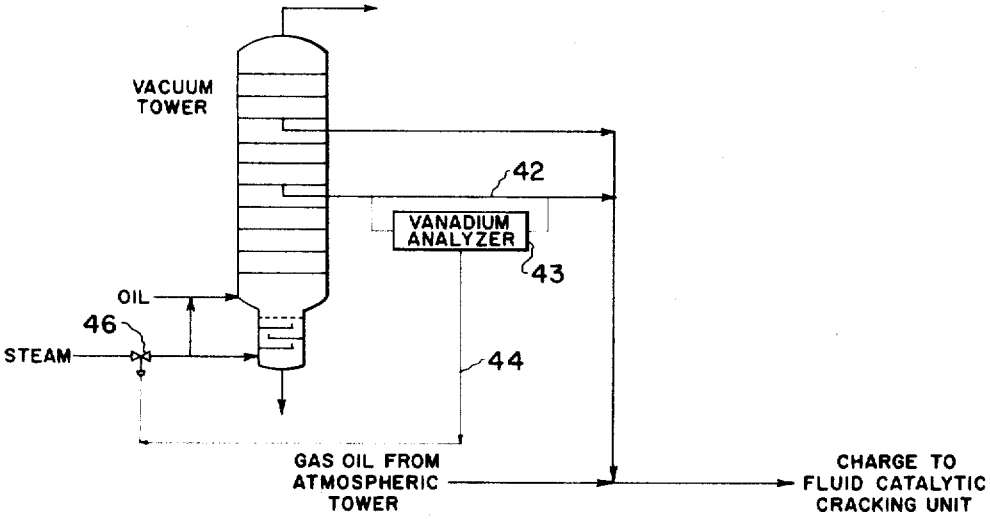
Figure 6:
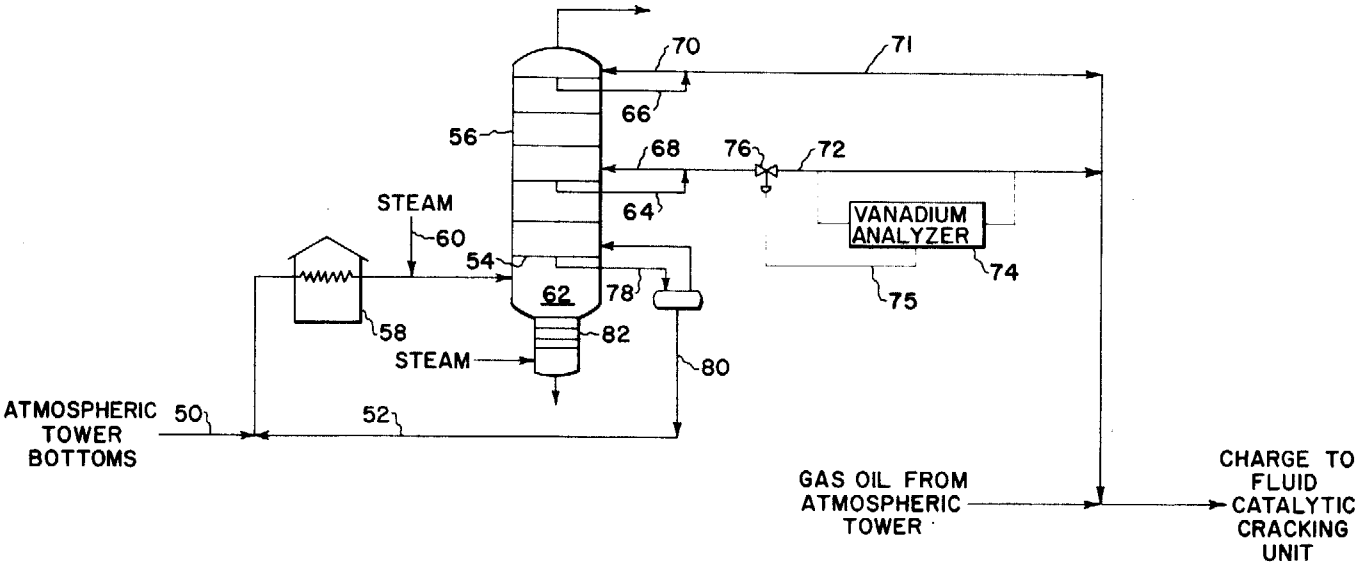
Figure 7:
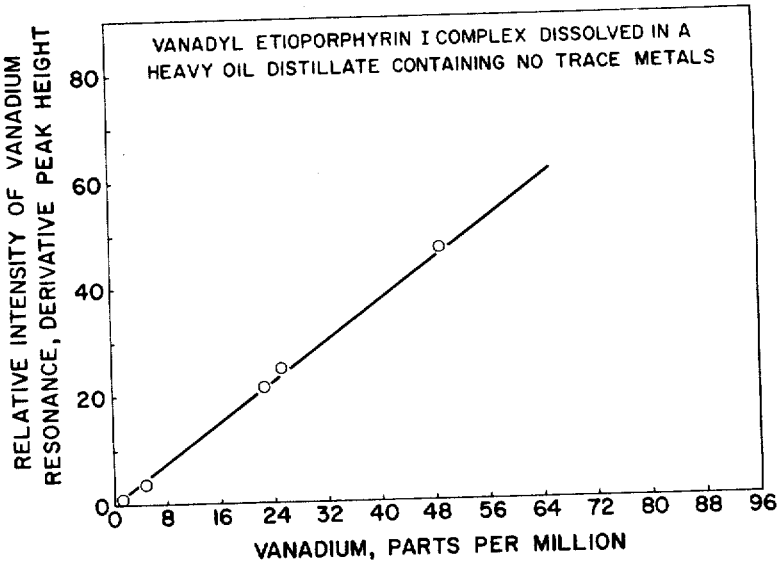
Figure 8:
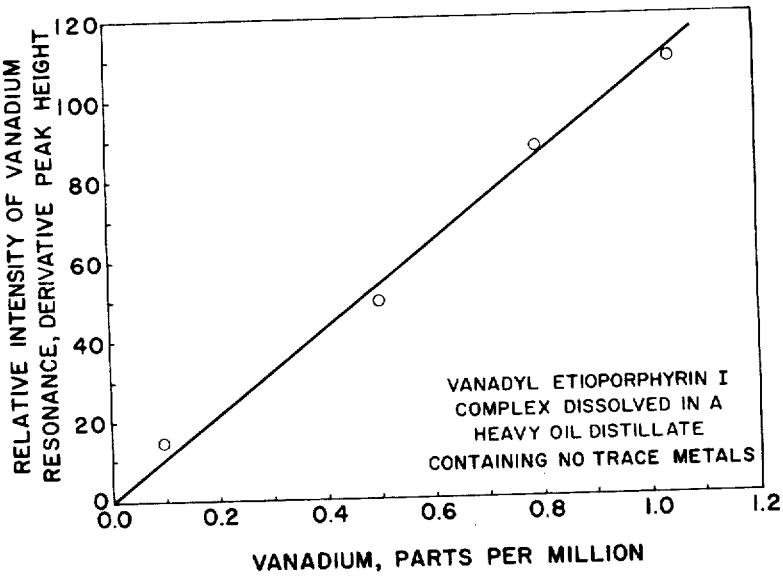

Referring now briefly to the drawings, FIGURE 1 is a diagram of electron paramagnetic resonance spectrometric apparatus in which the analytical method described herein can be carried out. FIGURE 2 comprises several plots of corresponding portions of the derivatives of the electron paramagnetic resonance spectra for several samples of a petroleum oil containing different amounts of paramagnetic vanadium, respectively. FIGURES 3(*a*) and 3(*b*) comprise, respectively, the plots of the derivatives of the entire electron paramagnetic resonance spectra for two oil samples containing paramagnetic vanadium. FIGURE 4 is a schematic representation of a fluid catalytic cracking unit involving control of a process variable in response to the electron paramagnetic resonance vanadium analysis of an oil stream. FIGURES 5 and 6 are schematic representation of vacuum distillation towers used in the preparation of charge stock for a catalytic cracking unit, wherein a process variable is controlled in response to the electron paramagnetic resonance vanadium analysis of oil streams produced by the towers. FIGURES 7 and 8 are calibration curves prepared from samples of a petroleum gas oil containing various amounts of paramagnetic vanadium.

Referring to FIGURE 1 in detail, numeral 2 refers to klystron oscillator to generate the microwaves to which the oil sample being tested is subjected. Numeral 4 refers to a four-arm microwave bridge circuit containing a silicon-tungsten crystal detector 6. Numbers 8 and 10 denote opposite poles of an electro-magnet adapted to create a magnetic field about the test sample. Power is supplied to the magnet by power supply 12, the magnitude of which is controlled by scanning control 14. Numeral 16 denotes a wave guide to conduct the microwaves from one arm of the bridge 4 to a microwave cavity 18 in which the test sample is placed. Numeral 20 refers to an amplifying system for amplifying the output of crystal detector 6. The rate of change in the amplified output of element 20 and the rate of change in the magnetic field strength are detected respectively by the signal phase detector 22 and audio sweep generator 24. The resultant absorption lines or curve, which in the instance described is the derivative of the curve of normal absorption, are recorded graphically by recorder 26. If desired, an oscilloscope 28 can be connected between the audio amplifier 20 or signal phase detector 22 and audio sweep generator 24 as indicated in the diagram for visual observation of the first derivative curve or its integral, which is the normal absorption curve.

The microwave bridge functions somewhat similarly to the familiar Wheatstone bridge, that is, a power output is obtained only when the bridge becomes unbalanced. Arm *a* of the microwave bridge 4 is connected to the klystron oscillator 2. Arm *c* of the bridge is connected to a dummy load that will absorb practically all of the microwave power incident thereon. Arm *b* is connected to crystal detector 6. Arm *d* is connected to the microwave cavity 18 by way of the wave guide 16. When arms *b* and *c* are matched to the bridge, i.e., when all the microwave power incident on the cavity 18 and the dummy load of arm *c* is absorbed, no power is emitted from arm *b*.

The microwave cavity 18 is oriented so the microwave magnetic field at the sample is perpendicular to the field of the electromagnet formed by poles 8 and 10.

The coupling of the microwave cavity to the bridge is accomplished by a small iris, not shown, at the bridge end of the cavity. The size of the iris is adjusted to match the cavity 18 to the bridge 4, i.e., zero reflection coefficient, by adjustment of a post, not shown, that extends partly across the iris.

To operate the device, the bridge and cavity are first balanced as indicated, then the bridge is slightly unbalanced by means of a slide screw tuner, not shown, so as to obtain a linear output from crystal detector 6. The EPR absorption spectrum can then be observed on an oscilloscope or by rectification of the A.C. components of the microwave bridge output and by display of the first derivative of the EPR signal on a graphic recorder.

In operation, a sample container, for example, a fused quartz tube, is positioned in resonant cavity 18 and the klystron oscillator 2 is locked up to the cavity with its automatic frequency control. The microwave bridge 4 is balanced by adjustment to zero leakage and the resonant cavity 18 is placed in the air gap of the magnet. The slide screw tuner of the microwave bridge 4 is then set for biasing the crystal detector in a linear operating region. The leakage imposed by the slide screw serves as a phase reference for the EPR signal. Microwave power is then maximized for maximum sensitivity by adjustment of the klystron tuner and the reflector voltage control. The magnetic field is then slowly altered by means of scanning unit 14. When resonance occurs in the sample the magnetic component of the microwave energy is absorbed in part by the paramagnetic vanadium electrons in the sample. Under these circumstances less energy is reflected to the bridge 4, whereby the bridge becomes unbalanced. The unbalancing of the bridge resulting from microwave energy absorption manifests itself as an A.C. electrical output through crystal 6. The output signal is proportional to the energy absorption by the sample. This output, after amplification in unit 20, can be plotted against change of magnetic field strength as such, or, as in the apparatus shown, the first derivative of the normal absorption curve can be plotted.

The operability of the analytical method disclosed herein has been demonstrated by analysis of numerous oil samples. In a particular instance, the analysis was carried out batchwise by placing gas oil samples to be analyzed in seprate, fused quartz tubes about 4.5″ in length, sealed at one end, each tube having an inner diameter of 3 mm.±12 percent and an outer diameter of 4.75 mm.±0.25 mm. so as to insure comparable sample geometry. The oil samples were maintained fluid during filling of the sample tubes by heating to 100° C. in an oven. The oils were solidified by cooling to room temperature before analysis in the EPR spectrometer. Reference oils were prepared covering the range of 0.1 to 50 p.p.m. paramagnetic, quadrivalent vanadium by dissolving known amounts of vanadyl etioporphyrin I complex in a heavy Taparito gas oil distillate that yielded no EPR spectrum and that contained no trace metals.

To determine the resonant spectrum for a given reference oil sample, an oil sample tube was placed in the microwave cavity of the three-centimeter wave guide of an X-band spectrometer, model V–4500, manufactured by Varian Associates, employing audio frequency magnetic field modulation and phase sensitive detection. The standard six-inch diameter pole face magnet, model V–4007 with a 2.00-inch air gap and matching power supply comprised the magnet system. A block diagram of the system employed is illustrated in FIGURE 1.

After the EPR spectrometer had been allowed to warm up for approximately 30 minutes, the klystron oscillator component, generating an electromagnetic wave at a frequency of 9.5 kilomegacycles per second (9.5 kmc./s.), was locked to the cavity and the microwave bridge was balanced, as described. After turning the microwave bridge for a linear output from the crystal detector, microwave power was maximized to about 110 milliwatts by adjustment of the klystron tuner and voltage controls.

The magnetic field was then slowly altered through the range of about 3300 to 3400 gauss to obtain the value at which resonance occurred for electronic precision in a microwave field. The scanning modulation employed for the magnetic field was 5 gauss, which was obtained by modulation setting of H–8–200. Since only one line of the hyperfine pattern is necessary for obtaniing the relative intensities, just a narrow portion of the vanadium resonance need be scanned.

It was possible to run off the various standard samples in a relatively short time by simply exchanging sample tubes in the resonant cavity. Usually, rebalancing of the microwave bridge was not necessary because all of the samples were of a similar dielectric nature. When slight changes in leakage did occur, rebalancing was done with the slide screw tuner. The results obtained with the standard samples, in terms of derivative peak height of EPR signal intensity relative to magnetic field strength $$\left(\frac{dI}{dH_0}\right)$$

and vanadium concentration in p.p.m. were as shown in FIGURES 7 and 8.

In analyzing the unknown gas oil samples, the derivative peak height, i.e., the height between the maximum points of deflection (see FIGURE 2), for the strongest peak attributable solely to paramagnetic vanadium was measured. The ratio of such peak height to the corresponding peak height of the reference, and hence the proportion of vanadium in the unknown on sample, was then obtained from the calibration curves in FIGURES 7 and 8. The sensitivity of the method is indicated by the following comparison of results for the herein-disclosed analytical method in connection with specific unknown oils, all of which were solidified at the ambient atmospheric conditions prevalent during the analysis, against the corresponding results obtained by chemical analysis.

TABLE A

| Description | Chemical Analysis: V, p.p.m. | EPR Analysis: V, p.p.m. |
|---|---|---|
| Kuwait Gas Oil | 0.56 | 0.7 |
| Vacuum Tower Bottoms | 14.2 | 18.9 |
| Visbroken Gas Oil | 0.67 | 0.1 |
| Kentucky Crude Bottoms | 118 | 121 |
| Topped West Texas Crude | 1.5 | 1.8 |
| Topped Lagamar Crude | 177 | 166 |

By way of illustrating the relative association of the EPR spectrometer employed in the present invention with various refinery processes, several suitable arrangements have been shown schematically in FIGURES 4, 5, and 6. Referring first to the apparatus shown in FIGURE 4, a portion of the oil feed to a conventional fluid catalytic cracking unit is by-passed from line 30 through a sample tube positioned in the resonant cavity of an EPR spectrometer 31 similar to that shown in FIGURE 1. As the output from the microwave bridge increases as a result of increasing vanadium content of the oil feed, the flow of instrument air to valves 32 and 33 is increased, by suitable transducing means, not shown, adapted to convert an electrical output from the microwave bridge of the spectrometer 31 to a pneumatic output, whereby the flow of catalyst through the dropout line 36 is increased and the rate of catalyst flow through make-up catalyst line 38 is increased. A reduction in the vanadium content of the oil feed will effect a decrease in the rate of catalyst replacement. The dashed line from the vanadium analyzer 31 to valve 34, which controls the flow of catalyst through dropout line 40 shows an alternative or auxiliary means of controlling the spent catalyst removal rate. In this way, the desired proportion of active catalyst in the system is maintained at the desired level, whereby the desired gasoline, gas and coke ratio is maintained.

In the apparatus shown in FIGURE 5, a portion of the highest-boiling oil side stream removed through line 42 from a conventional vacuum distillation tower used to prepare a gas oil feed to a conventional catalytic cracking unit, not shown, is continuously by-passed through a sample tube positioned within the resonant cavity of an EPR spectrometer 43 of the type shown in FIGURE 1. As the output of the microwave bridge increases with increasing vanadium content of the oil, the flow of instrument air through line 44 is increased through the use of suitable transducing means, not shown, whereby valve 46 is urged toward closure and the flow of steam to the stripping zone and flash zone of the vacuum tower is decreased. In this way, the proportion of high vanadium content bottoms volatilized or entrained is reduced, whereby the vanadium content of the oil in line 42 is decreased.

In the apparatus shown in FIGURE 6, a portion of the heavy gas oil side stream removed from vacuum tower 56 is by-passed through a sample tube positioned within the resonant cavity of an EPR spectrometer 74. As the output of the microwave bridge of EPR spectrometer 74 increases with increasing vanadium content of the oil, the flow of instrument air through line 75 is increased through the use of suitable transducing means, not shown, whereby valve 76 is urged toward closure, and whereby flow through line 72 is decreased and flow through recycle line 68 increased. Under these circumstances, the proportion of the heaviest components of the over-all vacuum tower gas oil, which components contain the greatest proportion of vanadium, will be reduced, whereby the vanadium content of a mixture of vacuum tower gas oil and light atmospheric tower gas oil will also be reduced.

In a working embodiment, with reference to FIGURE 6, 346.5 bbls. per hour of the bottoms from an atmospheric distillation tower, not shown, are passed through line 50 and blended with 13.8 bbls. per hour of recycle oil from line 52, obtained from the bottom tray 54 of the fractionation zone of the vacuum distillation tower 56 and the mixture is charged to a vaporizing heater 58 for the vacuum distillation tower 56. The heated feed is mixed with steam from line 60, and the over-all feed is passed to the flash zone 62 of the vacuum tower at a temperature of 757° F. In the flash zone, which is maintained at an absolute pressure of about 74 mm. Hg. the vaporizable components of the charge are flashed off from the unvaporized bottoms and are passed upwardly into the fractionation zone. As the vapors pass upwardly, they are washed with liquid retained in the trays, the heavier portion of the oil vapors being condensed in the liquid in the trays contacted thereby. Two oil side streams, in the respective amounts of 107.1 bbls. per hour and 97.5 bbls. per hour are withdrawn by way of lines 64 and 72 and lines 66 and 71 from the vacuum tower and blended with 341.3 bbls. per hour of a light gas oil stream obtained from the atmospheric distillation tower. Reflux streams from the respective side streams 64 and 66 are returned by way of lines 68 and 70 to the tower at a rate of 589 and 280 bbls. per hour, respectively. During such operations, a sample stream is withdrawn from lower side stream 72 and cooled to 120° F. at which temperature the viscosity is about 68 centistokes. This oil is subjected to EPR spectrometry and is found to have a normalized maximum derivative signal intensity of about 0.62. The ratio of this intensity to the similarly obtained signal intensity for a reference oil also having a viscosity of 68 centistokes at 120° F., the temperature at which it was subjected to EPR spectrometry, is found to be equal to 2. Since the reference oil is known to contain 6.25 p.p.m. vanadium, the oil in lower side stream 72 is found to contain 12.5 p.p.m. vanadium, at which conditions the vanadium content of the oil charged to the fluid unit is about 2.5 p.p.m. Under these circumstances, the hydrogen make in the catalytically cracked product, which is an indication of the selectivity of the catalyst, will stabilize at about 155 cu. ft. per bbl. of charge, which for purposes of this embodiment will be considered objectionable. In accordance with the present invention the output from the EPR spectrometer will reflect proportionately the vanadium content of the oil in line 72. This electrical output, or a suitable function thereof, is converted by suitable transducing means not shown, to a pneumatic signal which tends to close valve 76, whereby the proportion of oil drawn off in the side stream 72 is reduced and the proportion of oil recycled to the tower by way of line 68 is increased. When flow through line 68 is increased, more liquid is removed from the bottom tray of the fractionation zone and recycled to heater 58 by way of lines 78 and 80. The lighter portion of the recycled oil is then vaporized in the flash zone 62 along with the lighter portion of the fresh feed. The unvaporized heavier portion passes through the trays in the stripping zone 82 in countercurrent contact with steam and stripped oil vapors. In this way vanadium-containing ends that formerly entered line 72 as a result of entrainment rather than vaporization are recycled and are given a second opportunity to pass out of the tower in the form of vacuum tower bottoms. In a specific instance the rate of withdrawal through line 72 is reduced to about 54 bbls. per hour and the rate of recycle through line 68 is increased to 643 bbls. per hour. Under these circumstances, the vanadium content of the oil charged to the fluid unit reduces to about 1.25 p.p.m. Under these circumstances, the vanadium content of the oil charged to the fluid unit reduces to about 1.25 p.p.m. Under these circumstances, the hydrogen make of the catalytically cracked product will stabilize at about 100 cu. ft. per bbl. of charge. When the vanadium content of the oil in line 72 drops below 12.5 p.p.m., the rate of recycle through line 68 can be correspondingly reduced.

Although the invention has been described particularly in connection with a catalytic cracking operation, it is not limited thereto. Thus, the invention can be used in combination with any catalytic process in which the catalyst is adversely affected by vanadium, such as catalytic hydrogenation, hydroforming, platforming, or the like. Also, the present invention is not sollye useful to control the vanadium content of the charge to a catalytic unit, but can be used to control the content of other detrimental metals in various oil streams, such as nickel, notwithstanding that the nickel is not in paramagnetic form in the oil. In such cases, nickel content can be controlled similarly as the vanadium content by virtue of the fact that for most oils, nickel and vanadium occur in given streams in a fixed relationship. Thus, where the nickel:vanadium ratio is found to be about 2:1, a vanadium content in an oil stream of 0.4 p.p.m. will mean a nickel content of about 0.8 p.p.m. The action taken to control the nickel content of the oil is similar to that used to control vanadium, as nickel occurs in the same oil fractions as does vanadium.

The analytical method of the present invention is adaptable to petroleum refinery process control by virtue of the fact that it can be carried out rapidly, continuously without sample destruction, and by virtue of the fact that it is sensitive to vanadium in very small proportions. Although the method is readily adaptable to automatic control, it is also useful per se as an analytical tool, for example, in determining the vanadium content of petroleum residual fuels.

The expression "hydrocarbon oil" is employed herein in its usual sense to define oils that are composed chiefly of components containing mostly carbon and hydrogen, of which petroleum oils and various fractions derived therefrom are examples. The expression is not intended to exclude oils that contain minor proportions of elements other than carbon or hydrogen, such as sulfur, oxygen, nitrogen, etc., as is the normal case with petroleum oils and various fractions derived therefrom.

The expression "sampling at intervals" and like expressions are used herein to include intermittent or discontinuous sampling as well as continuous sampling.

By the expression "petroleum refining process" and the like is meant any process adapted for upgrading petroleum oils or fractions derived therefrom, including distillation, blending, and chemical and catalytic treating processes.

The invention is not limited to the embodiments shown and described herein. Many other modifications will occur to those skilled in the art and such modifications can be resorted to without departing from the spirit or scope of the invention. Accordingly, only such limitations should be imposed as are indicated in the appended claims.

I claim:

1. A method for controlling a petroleum refining process in response to changes in the vanadium content of an oil stream of said process, comprising sampling at intervals a hydrocarbon oil stream of said process that has a viscosity at the temperature at which it is to be subjected to electron paramagnetic resonance spectrometry sufficient that the minimum vanadium content to be determined will provide a detectable electrical output, subjecting each oil sample to be tested to electron paramagnetic resonance spectrometry to obtain an electrical output whose intensity is related to the amount of paramagnetic vanadium in the sample, and controlling a variable in a portion of said refinery process in response to said output so as to maintain the vanadium content in a selected zone of said refining process within a predetermined range.

2. A method for controlling a petroleum refining process in response to changes in the metal content of an oil stream utilized in said process, comprising sampling at intervals a hydrocarbon oil stream in said process that has a viscosity at the temperature at which it is to be subjected to electron paramagnetic resonance spectrometry sufficient that the minimum vanadium content to be determined will provide a detectable electrical output, subjecting each oil sample to be tested to electron paramagnetic resonance spectrometry to obtain an electrical output whose intensity is related to the amount of paramagnetic vanadium in the sample, and controlling a variable in a portion of said refining process in response to a function of the intensity of at least a portion of such output that is attributable to paramagnetic vanadium, so as to maintain the vanadium content in a selected zone of said refining process within a predetermined range.

3. A method for controlling a petroleum refining process in response to changes in the metal content of an oil stream utilized in said process, comprising sampling at intervals a hydrocarbon oil stream in said process that has a viscosity at the temperature at which it is to be subjected to electron paramagnetic resonance spectrometry sufficient that the minimum vanadium content to be determined will provide a detectable electrical output subjecting each oil sample to be tested to electron paramagnetic resonance spectrometry to obtain an electrical output whose intensity is related to the amount of paramagnetic vanadium in the sample, measuring the ratio for each such sample of a function of the intensity of at least a portion of such output that is attributable to paramagnetic vanadium, to the correspondingly obtained value for a reference oil containing a known portion of paramagnetic vanadium and having a viscosity at the temperature at which it is subjected to electron paramagnetic resonance spectrometry sufficient that the vanadium contained therein will provide a detectable electric signal, said ratios being determined for conditions such that any viscosity differences between the samples and the reference oil are substantially constant, and controlling a variable in a portion of said refining process in response to said ratio, so as to maintain the vanadium content in a selected zone of said refining process within a predetermined range.

4. A method for controlling a petroleum refining process in response to changes in the metal content of an oil stream of said process, comprising sampling at intervals a hydrocarbon oil stream of said process that has a viscosity at the temperature at which it is to be subjected to electron paramagnetic resonance spectrometry sufficient that the minimum vanadium content to be determined will provide a detectable electrical output subjecting each oil sample to be tested to electron paramagnetic resonance spectrometry to obtain an electrical output whose intensity is related to the amount of paramagnetic vanadium in the sample, measuring the ratio for each such sample of a function of the intensity of at least a portion of such output that is attributable to paramagnetic vanadium, to the correspondingly obtained value for a reference oil containing a known proportion of paramagnetic vanadium and also having a viscosity at the temperature at which it is subjected to electron paramagnetic resonance spectrometry sufficient that the vanadium contained therein will provide a detectable electric signal, said ratios are obtained for the oil samples and the reference oil at substantially similar viscosities, and controlling a variable in a portion of said petroleum refining process in response to said ratio, so as to maintain the vanadium content in a selected zone of said refining process within a predetermined range.

5. The method of claim 4 where said ratios are determined for conditions such that said ratios are determined for the oil samples and the reference oils at viscosities that do not differ by more than about 20 centistokes.

6. A method for controlling a petroleum refining process in response to changes in the metal content of an oil stream of said process, comprising sampling at intervals a hydrocarbon oil stream of said process that has a viscosity of at least 5 centistokes at the temperature at which it is to be subjected to electron paramagnetic resonance spectrometry, subjecting each oil sample to be tested to electron paramagnetic resonance spectrometry to obtain an electrical output whose intensity is related to the amount of paramagnetic vanadium in the sample, measuring the ratio for each such sample of a function of the intensity of at least a portion of such output that is attributable to paramagnetic vanadium, to the correspondingly obtained value for a reference oil containing a known proportion of paramagnetic vanadium and also having a viscosity of at least 5 centistokes at the temperature at which it is subjected to electron paramagnetic resonance spectrometry, said ratios being determined for conditions such that said ratios are obtained for the oil samples and the reference oil at substantially similar viscosities, and controlling a variable in a portion of said petroleum refining process in response to said ratio, so as to maintain the vanadium content in a selected zone of said refining process within a predetermined range.

7. A method for controlling a petroleum refining process in response to changes in the vanadium content of an oil stream of said process, comprising sampling at intervals a hydrocarbon oil stream of said process that has a viscosity of at least about 15 centistokes at the temperature at which it is to be subjected to electron paramagnetic resonance spetcrometry, subjecting each oil sample to be tested to electron paramagnetic spectrometry to obtain an electrical output whose intensity is related to the amount of paramagnetic vanadium in the sample, varying at least one of the wave frequency and the magnetic field strength employed in said spectrometry so as to obtain the maximum variation in output attributable solely to paramagnetic vanadium in the sample, measuring the difference between the minimum and maximum derivative intensities of said maximum output variation attributable solely to paramagnetic vanadium, measuring the ratio of said difference to the correspondingly obtained difference for a reference oil containing a known proportion of paramagnetic vanadium and also having a viscosity of at least about 15 centistokes at the temperature at which it is subjected to electron paramagnetic resonance spectrometry, said ratios being determined for conditions such that any differences in viscosities between the oil samples and the reference oil are within about 20 centistokes of constant, and controlling a variable in a portion of said refining process in response to said ratio, so as to maintain the vanadium content in a selected zone of said refining process within a predetermined range.

8. A method for controlling a petroleum refining process in response to changes in the metal content of an oil stream of said process, comprising sampling at intervals a hydrocarbon oil stream of said process that has a viscosity of at least about 5 centistokes at the temperature at which it is to be subjected to electron paramagnetic resonance spectrometry, and that is subsequently to be contacted with a catalyst that is adversely affected by the vanadium-including metal content of said oil, subjecting each oil sample to be tested to electron paramagnetic resonance spectrometry to obtain an electrical output whose intensity is related to the amount of paramagnetic vanadium in the sample, measuring the ratio for each sample of a function of the intensity of at least a part of such output that is attributable solely to vanadium, to the correspondingly obtained value for a reference oil containing a known proportion of paramagnetic vanadium and also having a viscosity of at least about 5 centistokes at the temperature at which it is subjected to electron paramagentic resonance spectrometry, said ratios being determined for conditions such that any differences in viscosities between the oil samples and the reference oil are within about 20 centistokes of constant, and controlling a variable in a portion of said refining process in response to said ratio to maintain the catalyst selectivity at a predetermined level.

9. A method for controlling a petroleum refining process in response to changes in the vanadium content of an oil stream of said process, comprising sampling at intervals a hydrocarbon oil stream of said process that has a viscosity of at least about 5 centistokes at the temperature at which it is to be subjected to electron paramagnetic resonance spectrometry, and that is subsequently to be contacted with a catalyst that is adversely affected by vanadium in said oil, subjecting each oil sample to be tested to electron paramagnetic resonance spectrometry to obtain an electrical output whose intensity is related to the amount of paramagnetic vanadium in the sample, varying at least one of the wave frequency and the magnetic field strength employed in said spectrometry so as to obtain the maximum variation in output attributable solely to paramagnetic vanadium in the sample, measuring the difference between the minimum and maximum derivative intensities of said maximum output variation attributable solely to paramagnetic vanadium, measuring the ratio for each such sample of difference to the correspondingly obtained difference for a reference oil containing a known proportion of paramagnetic vanadium and also having a viscosity of at least about 5 centistokes at the temperature at which it is subjected to electron paramagnetic resonance spectrometry, said ratios being determined for conditions such that any differences in viscosity between the oil samples and the reference oil are within about 20 centistokes of constant, and controlling a variable in a portion of said refining process in response to said ratio so as to maintain catalyst selectivity at a predetermined level.

10. A method for controlling a petroleum refining process in response to changes in the vanadium content of an oil stream of said process, comprising sampling at intervals a distillate hydrocarbon oil stream of said process that has a viscosity of at least 5 centistokes at the temperature at which it is to be subjected to electron paramagnetic resonance spectrometry, and that forms at least a portion of the feed to a catalytic cracking operation in which said feed is catalytically cracked and contacted with a cracking catalyst that is adversely affected by the vanadium-including metal content of said oil, subjecting each oil sample to be tested to electron paramagnetic resonance spectrometry to obtain an electrical output whose intensity is related to the amount of paramagnetic vanadium in the sample, measuring the ratio for each sample of a function of the intensity of at least a portion of such output that is attributable solely to vanadium to the correspondingly obtained value for a reference oil containing a known proportion of paramagnetic vanadium and also having a viscosity of at least 5 centistokes at the temperature at which it is subjected to electron paramagnetic resonance spectrometry, said ratios being determined for conditions such that any differences in viscosity between the oil samples and the reference oil are substantially constant, and controlling a variable in at least one of said catalytic cracking operation and the distillation conditions under which said distillate hydrocarbon oil stream is produced in response to said ratio so as to maintain the catalyst selectivity at a predetermined level.

11. A method for controlling a petroleum refining process in response to changes in the vanadium content of an oil stream of said process, comprising sampling at intervals a distillate hydrocarbon oil stream of said process that has a viscosity of at least five centistokes at the temperature at which it is to be subjected to electron paramagnetic resonance spectrometry, and that forms at least a portion of the feed to a catalytic cracking operation in which said feed is catalytically cracked and contacted with a cracking catalyst that is adversely affected by the vanadium-including metal content of said oil, subjecting each oil sample to be tested to electron paramagnetic resonance spectrometry to obtain an electrical output whose intensity is related to the amount of paramagnetic vanadium in the sample, measuring the ratio for each such sample of a function of the intensity of at least a portion of such output that is attributable solely to vanadium, to the correspondingly obtained value for a reference oil containing a known proportion of paramagnetic vanadium and also having a viscosity of at least five centistokes at the temperature at which it is subjected to electron paramagnetic resonance spectrometry, said ratios being determined for conditions such that any differences in viscosity between the oil samples and the reference oil are substantially constant and controlling the distillation conditions under which said distillate hydrocarbon oil stream is produced in response to said ratio so as to maintain the catalyst selectivity at a predetermined level.

12. A method for controlling a petroleum refining process in response to changes in the vanadium content of an oil stream of said process, comprising sampling at intervals a distillate hydrocarbon oil stream of said process that has a viscosity of at least five centistokes at a temperature at which it is to be subjected to electron paramagnetic resonance spectrometry, and that forms at least a portion of the feed to a catalytic cracking operation in which said feed is catalytically cracked and contacted with a cracking catalyst that is adversely affected by the vanadium-including metal content of said oil, subjecting each oil sample to be tested to electron paramagnetic resonance spectrometry to obtain an electrical output whose intensity is related to the amount of paramagnetic vanadium in the sample, varying at least one of the wave frequency and the magnetic field strength employed in said spectrometry so as to obtain the maximum variation in output attributable solely to paramagnetic vanadium in the sample, measuring the difference between the points of maximum deflection of the derivative intensities of said maximum output variation attributable solely to paramagnetic vanadium, measuring the ratio of said difference to the correspondingly obtained difference for a reference oil containing a known proportion of paramagnetic vanadium and also having a viscosity of at least 5 centistokes at the temperature at which it is subjected to electron paramagnetic resonance spectrometry, said ratios being determined for conditions such that any differences in viscosity between the oil samples and the reference oil are substantially constant, and controlling the distillation conditions under which said distillate hydrocarbon oil stream is produced in response to said ratio so as to maintain the catalyst selectivity at a predetermined level.

13. A method of quantitatively analyzing a hydrocarbon oil for a metal whose content is related to the vanadium content of the oil, comprising providing a sample of a hydrocarbon oil having an unknown vanadium content and a viscosity at the temperature at which it is to be subjected to electron paramagnetic resonance spectrometry sufficient that the minimum vanadium content to be determined will provide a detectable electric signal, subjecting the sample to electron paramagnetic resonance spectrometry to obtain an electrical output whose intensity is related to the amount of paramagnetic vanadium in the sample, varying at least one of the wave frequency and the magnetic field strength employed in said spectrometry so as to obtain the maximum variation in output attributable to paramagnetic vanadium in the sample, measuring the difference between the points of maximum deflection of the derivative intensities of said maximum output variation, measuring the ratio of said difference to the correspondingly obtained difference for a reference oil containing a known proportion of paramagnetic vanadium and also having a viscosity at the temperature at which it is subjected to electron paramagnetic resonance spectrometry sufficient that the vanadium contained therein will provide a detectable electric signal, said ratio being determined for the oil sample and the reference oil at substantially similar viscosities, the paramagnetic vanadium content of said oil sample bearing the same relation to that of the reference oil as the measured ratio.

14. The method of claim 13 where the conditions under which said ratio is determined are such that said ratio is obtained for the oil sample and the reference oil at viscosities that do not differ by more than about 20 centistokes.

15. A method of quantitatively analyzing a hydrocarbon oil for vanadium content, comprising providing a sample of a hydrocarbon oil having an unknown vanadium content and a viscosity of at least about five centistokes at the temperature at which it is to be subjected to electron paramagnetic resonance spectrometry, subjecting the sample to electron paramagnetic resonance spectrometry to obtain an electrical output whose intensity is related to the amount of paramagnetic vanadium in the sample, varying at least one of the wave frequency and the magnetic field strength employed in said spectrometry so as to obtain the maximum variation in output attributable solely to paramagnetic vanadium in the sample, measuring the difference between the points of maximum deflection of the derivative intensities of said maximum output variation, measuring the ratio of said difference to the correspondingly obtained difference for a reference oil containing a known proportion of paramagnetic vanadium and having substantially similar viscosity characteristics as said oil sample at the temperature at which it is subjected to electron paramagnetic resonance spectrometry, the paramagnetic vanadium content of said oil sample bearing the same relation to that of the reference oil as the measured ratio.

16. The method of claim 15 where the viscosities of the oil sample and the reference oil at the temperatures at which they are subjected to electron paramagnetic resonance spectrometry do not differ by more than about 20 centistokes.

17. A method for controlling a petroleum refining process in response to changes in the vanadium content of an oil stream of said process, comprising sampling at intervals a process stream of a hydrocarbon oil having a viscosity at the temperature at which it is to be subjected to electron paramagnetic resonance spectrometry of at least about 15 centistokes and sufficient that the minimum vanadium content to be determined will provide a detectable electrical output, subjecting each oil sample to be tested to electron paramagnetic resonance spectrometry at a temperature in the range of ambient atmospheric temperature to about 110° F. to obtain an electrical output whose intensity is related to the amount of paramagnetic vanadium in the sample, and controlling a variable in a portion of said refining process in response to said output, so as to maintain the vanadium content in a selected zone of said refining process within a predetermined range.

*18. In processing hydrocarbons in a system susceptible to vanadium poisoning the method which comprises:*

*(a) sampling a process stream in said system,*

*(b) establishing a magnetic field in a test zone,*

*(c) substantially solidifying each sample,*

*(d) irradiating each substantially solidified sample within said test zone with electromagnetic waves to induce electron spin resonances in each said sample,*

*(e) sensing variations in absorbtion in successive substantially solidified samples in said test zone to produce vanadium dependent signals, and*

*(f) modifying the concentration of vanadium in a selected zone of said system in response to a characteristic of said signals attributable to the presence of vanadium in said process stream.*

*19. In processing hydrocarbons in a system susceptible to vanadium poisoning the method which comprises:*

*(a) withdrawing a sample stream from a process stream in said system,*

*(b) establishing a magnetic field in a test zone,*

*(c) substantially solidifying said sample stream and passing it through said test zone,*

*(d) irradiating said substantially solidified sample stream within said test zone with electromagnetic waves to induce electron spin resonances in said sample stream,*

*(e) sensing variations is absorption in said sample stream in said test zone to produce vanadium dependent signals, and*

*(f) modifying the concentration of vanadium in a selected zone of said system in response to the variation in a characteristic of said signals attributable to the presence of vanadium in said process stream.*

*20. A method of quantitatively analyzing a hydrocarbon oil for vanadium content which comprises:*

*(a) sampling said hydrocarbon oil,*

*(b) establishing a magnetic field in a test zone,*

*(c) substantially solidifying said sample,*

*(d) irradiating said substantially solidified sample within the said test zone with electromagnetic waves to induce electron spin resonances in said sample and produce a vanadium dependent signal, and*

*(e) determining the vanadium concentration in said sample by comparing a characteristic of said vanadium dependent signal with the same characteristic of a vanadium dependent signal obtained from a substantially solidified standard of known vanadium content.*

21. *A method of quantatively analyzing a substantially*

*solid hydrocarbon for vanadium content which comprises:*

(*a*) *sampling said hydrocarbon,*

(*b*) *establishing a magnetic field in a test zone,*

(*c*) *irradiating said substantially solid sample within the said test zone wtih electromagnetic waves to induce electron spin resonances in said sample and produce a vanadium dependent signal, and*

(*d*) *determining the vanadium concentration in said sample by comparing a characteristic of said vanadium dependent signal with the same characteristic of a vanadium dependent signal obtained from a substantially solidified standard of known vanadium content.*

References Cited

UNITED STATES PATENTS

| | | | |
|---|---|---|---|
| 2,909,482 | 10/1959 | Williams et al. | 196—132 |
| 2,925,374 | 2/1960 | Gwin et al. | 208—251 |
| 2,926,129 | 2/1960 | Kimberlin et al. | 208—251 |
| 2,929,776 | 3/1960 | Padovani et al. | 208—251 |
| 2,955,252 | 10/1960 | Williams | 73—53 |
| 2,966,454 | 12/1960 | Corbett | 208—251 |
| 2,999,381 | 9/1961 | Chope et al. | 73—73 |
| 3,140,993 | 7/1964 | Roberts | 208—251 |

SAMUEL P. JONES, *Primary Examiner.*

DELBERT E. GANTZ, *Examiner.*